(12) United States Patent
Books et al.

(10) Patent No.: US 9,340,202 B2
(45) Date of Patent: May 17, 2016

(54) ENGINE START/STOP FUNCTION MANAGEMENT AND CONTROL ARCHITECTURE

(71) Applicant: Cummins Inc., Columbus, IN (US)

(72) Inventors: Martin Books, Columbus, IN (US); Praveen Muralidhar, Greenwood, IN (US); Vivek Anand Sujan, Columbus, IN (US); Fan Zeng, Columbus, IN (US); C. Larry Bruner, Greenwood, IN (US); Anant Puri, Columbus, IN (US); Hoseinali Borhan, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 17 days.

(21) Appl. No.: 14/294,649

(22) Filed: Jun. 3, 2014

(65) Prior Publication Data

US 2015/0252770 A1    Sep. 10, 2015

Related U.S. Application Data

(60) Provisional application No. 61/950,450, filed on Mar. 10, 2014.

(51) Int. Cl.
*B60L 9/00* (2006.01)
*B60W 20/00* (2016.01)
*F02N 11/08* (2006.01)

(52) U.S. Cl.
CPC ........... *B60W 20/40* (2013.01); *F02N 11/0818* (2013.01); *F01N 2610/02* (2013.01); *F01N 2610/1486* (2013.01); *F02N 11/084* (2013.01); *F02N 11/0822* (2013.01); *F02N 11/0825* (2013.01); *F02N 11/0833* (2013.01); *F02N 2200/023* (2013.01); *F02N 2200/026* (2013.01); *F02N 2200/061* (2013.01); *F02N 2200/0801* (2013.01); *F02N 2200/101* (2013.01); *F02N 2200/102* (2013.01); *F02N 2200/12* (2013.01); *F02N 2300/306* (2013.01); *Y02T 10/48* (2013.01); *Y10S 903/903* (2013.01)

(58) Field of Classification Search
CPC .............................. B60W 10/06; B60W 20/00
See application file for complete search history.

(56) References Cited

U.S. PATENT DOCUMENTS

| | | | |
|---|---|---|---|
| 4,453,506 | A | 6/1984 | Ueda et al. |
| 6,371,889 | B1 | 4/2002 | Kuroda et al. |
| 6,532,926 | B1 | 3/2003 | Kuroda et al. |
| 6,622,804 | B2 | 9/2003 | Schmitz et al. |
| 6,817,329 | B2 | 11/2004 | Buglione et al. |
| 6,830,534 | B2 | 12/2004 | Seibertz et al. |

(Continued)

OTHER PUBLICATIONS

KR/International Searching Authority International Search Report and Written Opinion, PCT Application No. PCT/2015/019380, dated Jun. 18, 2015, 17 pgs.

*Primary Examiner* — Michael D Lang
(74) *Attorney, Agent, or Firm* — Taft Stettinius & Hollister LLP

(57) ABSTRACT

Unique apparatuses, systems, methods, and techniques for control of engine systems are disclosed. One embodiment is a unique controls process providing engine start/stop functionality. In one form, the controls process includes engine stop controls which evaluate a plurality of engine stop request conditions and a plurality of engine stop capability conditions, as well as engine start controls which evaluate a plurality of engine start request conditions and a plurality of engine start capability conditions.

20 Claims, 11 Drawing Sheets

(56) References Cited

U.S. PATENT DOCUMENTS

| | | |
|---|---|---|
| 7,017,542 B2 | 3/2006 | Wilton et al. |
| 7,036,477 B1 | 5/2006 | Thompson et al. |
| 7,130,731 B2 | 10/2006 | Itoh et al. |
| 7,558,666 B2 | 7/2009 | DiGonis |
| 7,890,243 B2 | 2/2011 | Abendroth |
| 8,015,810 B2 | 9/2011 | Theobald |
| 8,453,620 B2 | 6/2013 | Abboud et al. |
| 2008/0051977 A1 | 2/2008 | Tryon |
| 2009/0133946 A1 | 5/2009 | Pels et al. |
| 2010/0038158 A1 | 2/2010 | Whitney et al. |
| 2011/0072792 A1* | 3/2011 | Bidner et al. ............... 60/278 |
| 2011/0246013 A1 | 10/2011 | Yee et al. |
| 2012/0208672 A1* | 8/2012 | Sujan ............... B60W 10/02 477/5 |
| 2013/0074795 A1 | 3/2013 | Michel et al. |
| 2013/0158838 A1 | 6/2013 | Yorke et al. |

\* cited by examiner

ENGINE START/STOP FUNCTION MANAGEMENT AND CONTROL ARCHITECTURE

BACKGROUND

The present application relates generally to engine start/stop controls for powertrains and more particularly, but not exclusively to engine start/stop controls for hybrid vehicle powertrains. Start/stop functionality for powertrains holds a number of potential benefits including reducing fuel consumption and mitigating emissions. Various controls schemes have been proposed for providing powertrains with start/stop functionality. While providing some benefits, existing approaches suffer from a number of drawbacks, shortcomings and disadvantages. Some approaches may result in engine start or stop operations which are undesirable in light of the state of operation of a vehicle or one or more of its constituent systems risking wear or damage to system components. Some approaches may make start/stop controls decisions resulting in significant missed opportunity for fuel savings. Some approaches fail to distinguish between operational states which appear similar based upon raw information provided to a controller, but require different start/stop controls decisions to be made if considered in the context of additional information. Some approaches are narrowly tied to particular system implementations and are insufficiently flexible and robust to apply across a broad range of engine platforms and vehicle applications. Some approaches fail to account for scenarios where an engine may be installed across a variety of powertrain platforms with differing components and needs. There remains a significant need for the unique apparatuses, methods and systems disclosed in the present application.

DISCLOSURE OF ILLUSTRATIVE EMBODIMENTS

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique controls process providing engine start/stop functionality. In one form, the controls process includes engine stop controls which evaluate a plurality of engine stop request conditions and a plurality of engine stop capability conditions, as well as engine start controls which evaluate a plurality of engine start request conditions and a plurality of engine start capability conditions. Further embodiments, forms, objects, features, advantages, aspects, and benefits shall become apparent from the following description and drawings.

DETAILED DESCRIPTION

Figure 1:
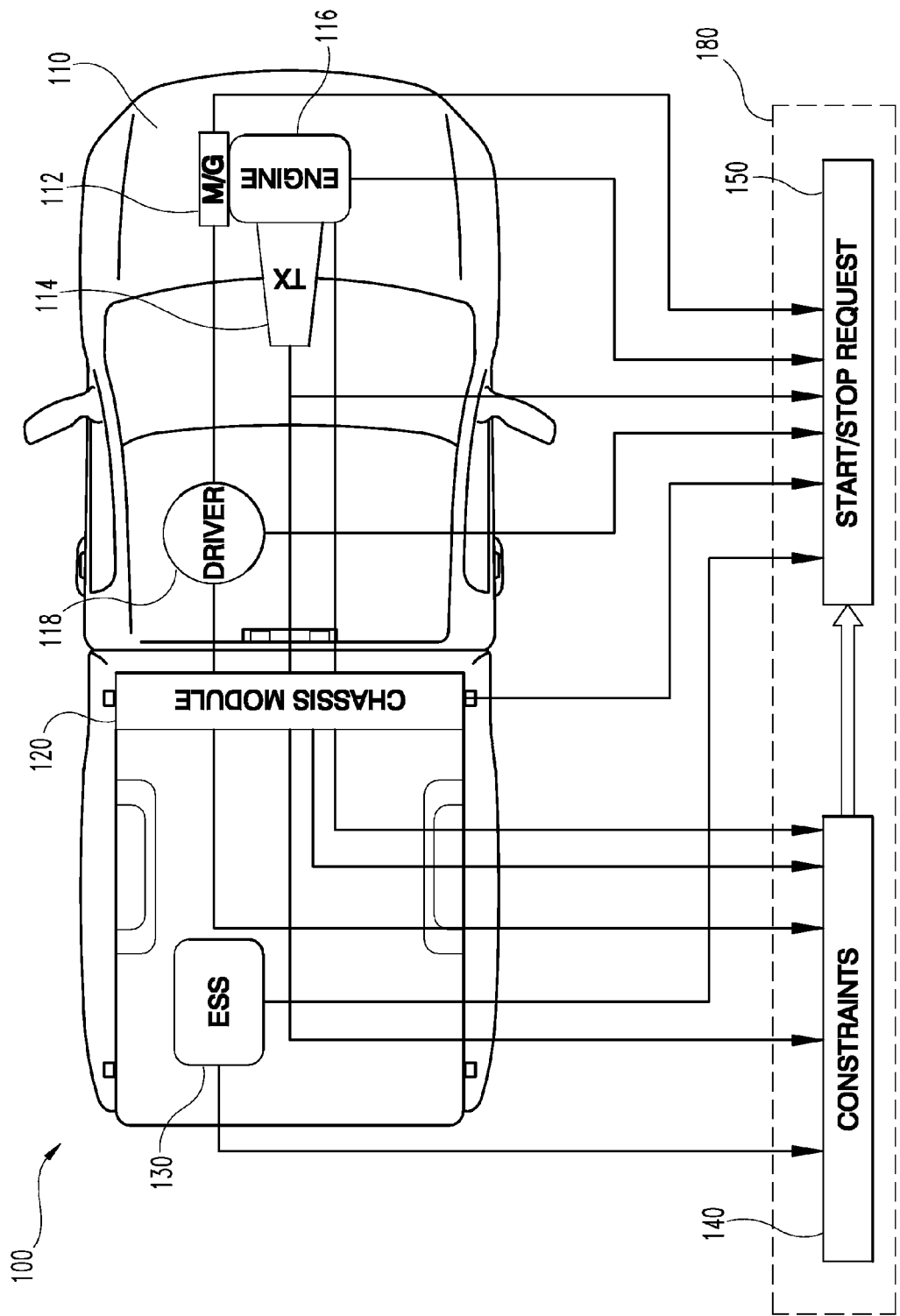
FIG. 1 illustrates a partially schematic view of an exemplary hybrid vehicle system.

With reference to FIG. 1 there is illustrated an exemplary hybrid vehicle system 100. The hybrid vehicle system 100 comprises a plurality of systems including vehicle chassis system 110, motor/generator system 112, transmission system 114, engine system 116, and operator controls system 118. In the illustrated embodiments vehicle chassis 110 is depicted as a heavy duty on-highway truck, however, it shall be appreciated that a variety of different types of vehicle chassis are also contemplated. Non-limiting examples of these include on-highway vehicles, off-highway vehicles, construction equipment, mining trucks, buses, and passenger vehicles, among others.

Engine system 116 may be provided in a variety of forms. In an exemplary embodiment, engine system 116 includes a compression ignition internal combustion engine with turbocharged air intake system and exhaust aftertreatment system. Motor/generator system 112 may also be provided in a variety of forms. For example, motor/generator system 112 may be arranged to provide so-called parallel hybrid systems, series hybrid systems, or in a variety of other configurations. Transmission system 114 may also be provided in a variety of forms including, for example, automatic transmissions, manual transmissions, and automated manual transmissions. Operator controls 118 typically include an accelerator pedal, a brake pedal, and a parking brake control, among other controls. It is contemplated that various other operator controls may be used depending upon the particular type of vehicle chassis which is utilized and the particular arrangement of the operator cabin.

Hybrid vehicle system 100 further includes an energy storage system 130 which is operative coupled with motor/generator system 112. It is contemplated that energy storage system 130 may take a variety of forms. For example, energy storage system 130 may include a battery pack and power electronics for power conversion between energy storage system 130 and motor/generator system 112. Other embodiments contemplate alternate forms of energy storage system 130, for example, hydraulic energy storage systems and pneumatic energy storage systems, among others. It shall be appreciated that motor/generator system 112 may also be configured as either an electrical motor/generator system, or a hydraulic, pneumatic or other type of motor/generator system.

Hybrid vehicle system 100 further includes a controls system including engine control module 180 and chassis control module 120. In the illustrated embodiments, engine control module 180 is configured to receive information from energy storage system 130, operator control system 118, transmission system 114, motor/generator system 112, and engine system 116. These and other information inputs may be provided to constraints controls 140. Certain inputs may be provided directly to constraints controls 140 whereas others may be provided using an intermediate transmitting or other device or relay device such as chassis control module 120. Engine control module 180 also includes start/stop requests control module 150 which receives inputs from motor/generator system 112, engine system 116, transmission system 114, operator controls system 118, chassis control module 120, and energy storage system 130. The constraints module 140 and the start/stop request module 150 may be configured in a variety of manners to control engine start events and stop events based upon whether conditions for requesting a start or stop event are present, as well as whether constraints permitting or disallowing a start or stop event are present.

Engine control module 180 may be configured to implement a plurality of controls for hybrid vehicle system 100 including engine start/stop controls. It shall be appreciated that the controls described herein may also be implemented in connection with a variety of additional or alternate control systems including the alternative configurations discussed herein. It shall also be appreciated that the controls described in the present application may be implemented in various combinations of hardware, firmware and/or software which may be provided in a single microprocessor based controller or control module or, in a plurality of such modules such as a distributed controller system in which a plurality of controllers communicate via a controller-area network (CAN). It shall further be appreciated that chassis control module 120 is one example of a so-called external controller which may communicate start or stop requests to engine control module 180. Such configuration and functionality may be applied in a variety of contexts, for example, when an engine system is provided separately or modularly to interface with a plurality of OEM chassis including different OEM chassis control modules.

Figure 2:
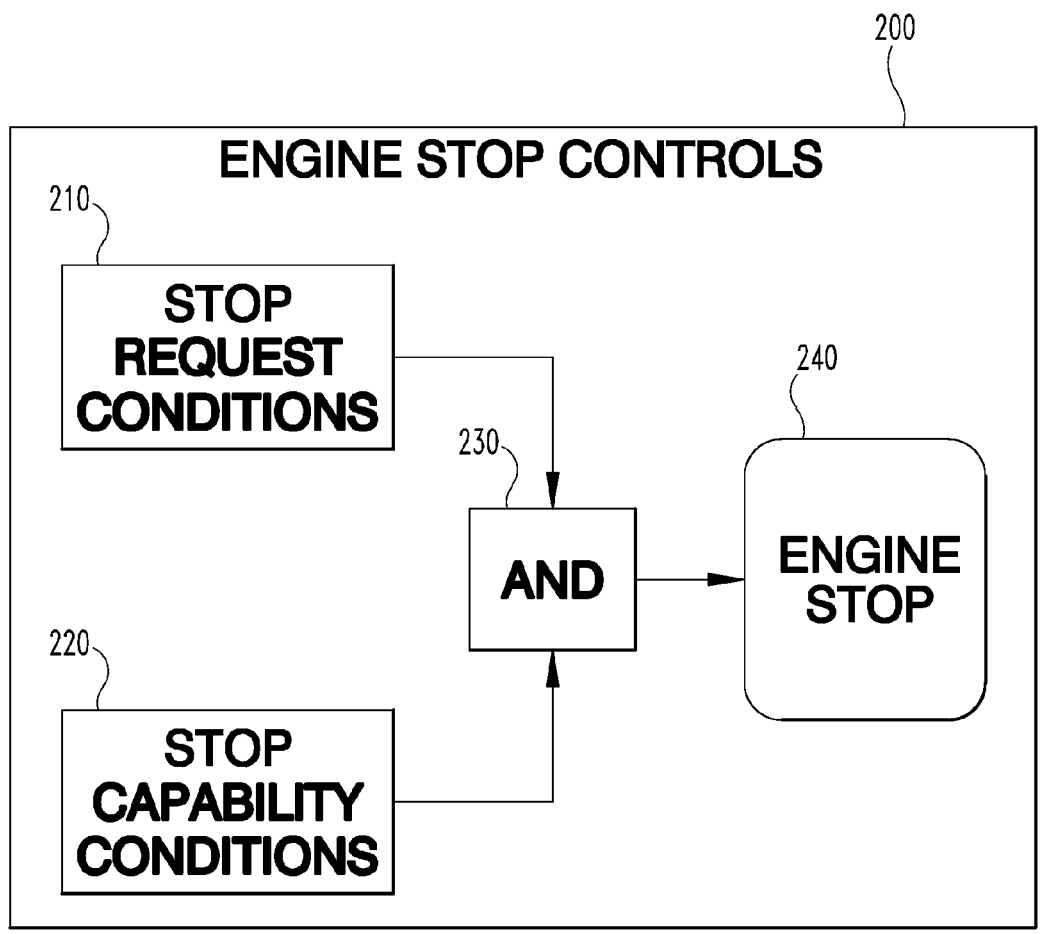
FIGS. 2-7 illustrate exemplary engine stop controls.

With reference to FIG. 2 there is illustrated a block diagram of exemplary engine stop controls 200 including a stop request conditional block 210 which evaluates whether one or more stop request conditions are satisfied. A number of forms and implementations of block 210 are contemplated. In one example, block 210 evaluates whether operator conditions, vehicle conditions, engine conditions, engine accessory conditions, and external controller conditions meet certain criteria. Further exemplary engine stop request logic is described below in connection with FIG. 3

Stop controls 200 further include a stop capability conditional block 220 which evaluates whether one or more stop capability conditions are satisfied. A number of forms and implementations of block 220 are contemplated. In one example, block 220 evaluates whether engine conditions, aftertreatment system conditions, vehicle conditions, energy storage system conditions, motor/generator conditions, and system service conditions meet certain criteria. Further exemplary engine stop capability logic is described below in connection with FIG. 4

The output of stop request conditional block 210 and the output of stop capability conditional block 220 are provided to AND operator block 230 which is configured to perform a logical AND operation relative to the outputs of blocks 210 and 220. The output of AND operator block 230 is provided to engine stop command block 240. When the output of operator block 230 is true, engine stop command block 240 sets the logical state of an engine stop request variable to true. When the output of operator block 230 is false, engine stop command block 240 sets the logical state of an engine stop request variable to false.

Figure 3:
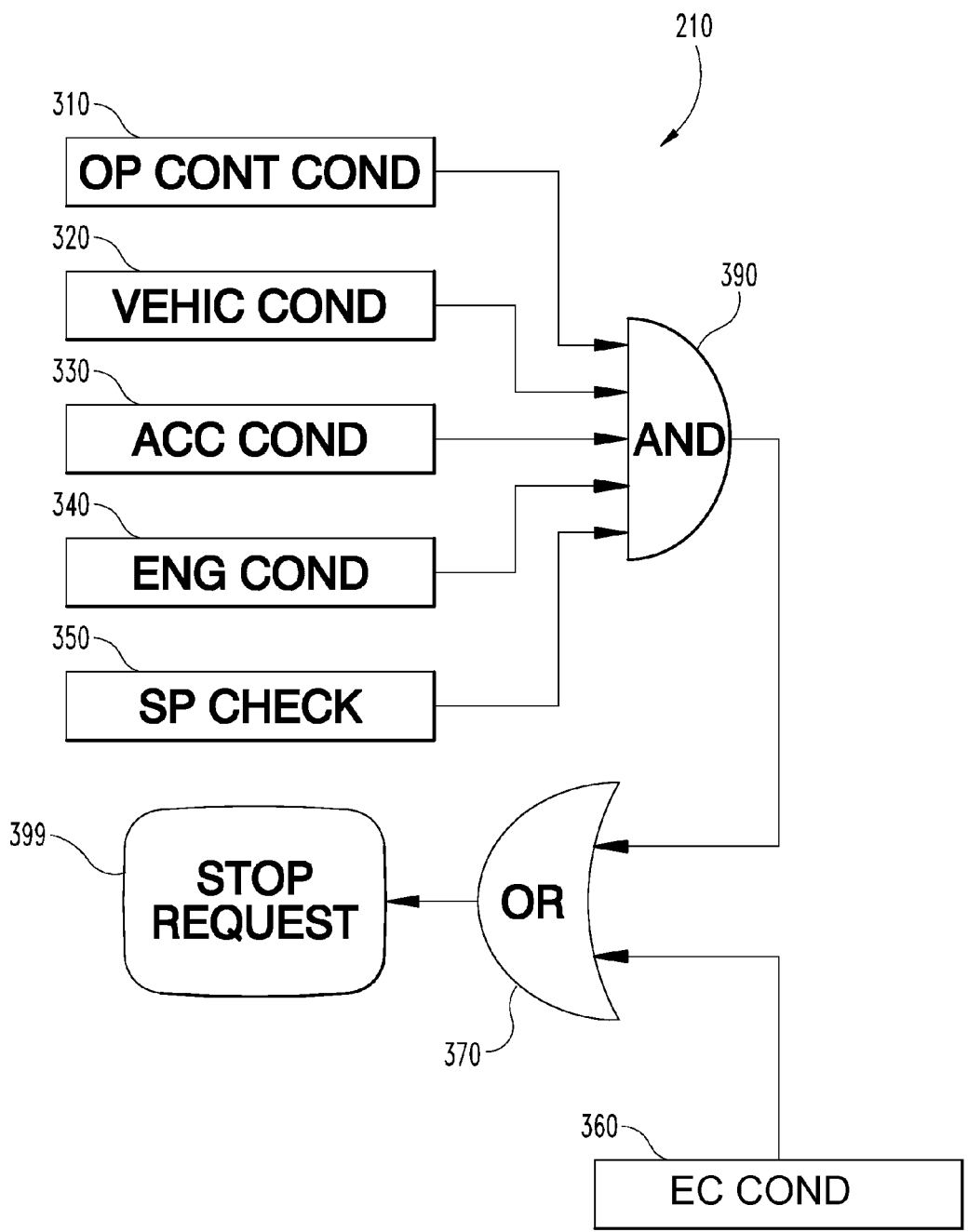

With reference to FIG. 3 there are illustrated further details of one exemplary implementation of stop request conditional block 210. In the illustrated embodiment, block 210 evaluates an operator controls condition 310, a vehicle condition 320, an accessories condition 330, an engine condition 340, and processes/sensors check condition 350, and provides the logical values resulting from these condition evaluations as inputs to logical AND operator 390. The output of logical AND operator 390 is provided to logical OR operator 370 whose output is in turn provided to stop request variable 399. External controller condition 360 is also evaluated and provided as an input to logical OR operator 370. In this implementation, when each of the conditions 310, 320, 330 and 340 are true, stop request variable 399 will also be true, but if any of conditions 310, 320, 330 and 340 is false, stop request variable 399 may be false depending on the state of external controller condition 360.

Figure 4:
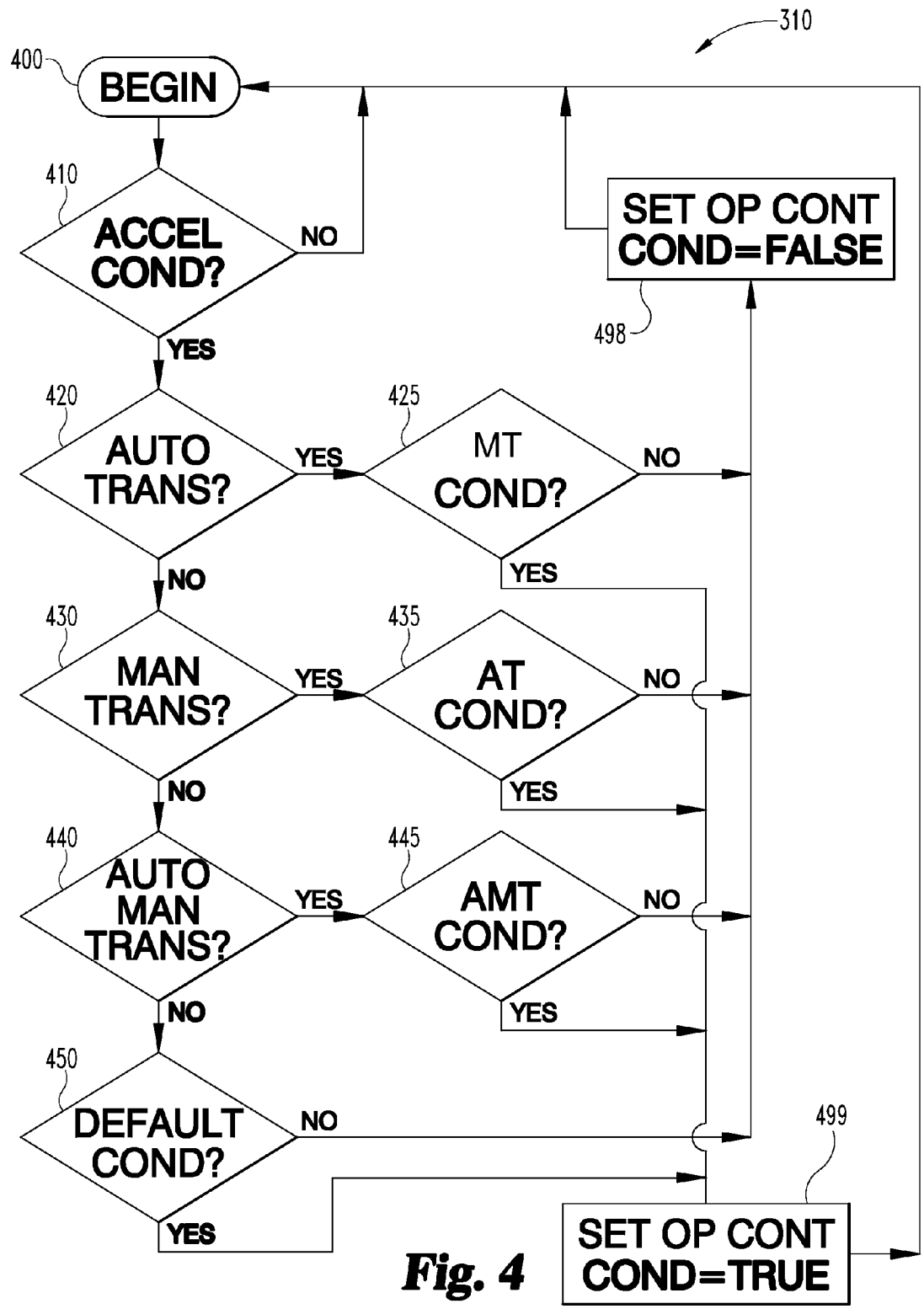

With reference to FIG. 4 there are illustrated further details of an exemplary control process implementing operator controls condition 310. In the illustrated example, the controls process begins at operation 400 and proceeds to conditional 410 which evaluates an operator control condition. In one form, conditional 410 is configured to evaluate whether an accelerator position is zero or is near zero and dropping rapidly. If conditional 410 is not true, the process proceeds to operator 498 which sets the operator controls condition variable equal to false and then returns to operation 400 and may repeat. If conditional 410 is true the process proceeds to conditional 420.

Conditional 420 evaluates whether the system under control includes an automatic transmission. In one form, conditional 420 broadcasts or otherwise outputs a query effective to determine whether the system includes an automatic transmission. The query may be provided directly to an external controller, for example, a transmission controller or an intermediate controller, or may be broadcast on a CAN or by a member of other techniques. The response to the query may be provided by one or more external controllers which may include a transmission controller and/or other system controllers.

Conditional 420 may also be configured to evaluate preprogrammed or calibrated information indicating a type of transmission present in a vehicle system. If conditional 420 is not true, the process proceeds to operation 430. If conditional 420 is true, the process proceeds to conditional 425 which evaluates an automatic transmission condition. In one form, conditional 425 may evaluate whether (i) the transmission is in a drive state and either the brake pedal is depressed or the parking brake is engaged, or (ii) the transmission is in a park state. If conditional 425 is true the process proceeds to operator 499 which sets the logical value of operator controls condition variable equal to true. If conditional 420 is not true the process returns to operation 400 and may repeat.

Conditional 430 evaluates whether the system under control includes a manual transmission. This evaluation may be performed in any of the exemplary manners discussed above in connection with conditional 420. If conditional 430 is not true, the process proceeds to operation 440. If conditional 430 is true, the process proceeds to conditional 435 which evaluates a manual transmission condition. In one form, conditional 435 may evaluate whether (i) the brake pedal is depressed or the parking brake is engaged, or (ii) the gear position is in neutral and the clutch position is zero, for example, if the clutch pedal is not depressed or the clutch is disengaged. If conditional 435 is true the process proceeds to operator 499 which sets the operator controls condition variable equal to true. If conditional 435 is not true the process returns to operation 400 and may repeat.

Conditional 440 evaluates whether the system under control includes an automated manual transmission. This evaluation may be performed in any of the exemplary manners discussed above in connection with conditional 420. If conditional 440 is not true, the process proceeds to operation 450. If conditional 440 is true, the process proceeds to conditional 445 which evaluates an automated manual transmission condition. In one form, conditional 445 may evaluate whether the transmission is in a drive state and either the brake pedal is depressed or the parking brake is engaged. If conditional 445 is true the process proceeds to operator 499 which sets the operator controls condition variable equal to true. If conditional 445 is not true the process returns to operation 400 and may repeat.

Conditional 450 evaluates a default condition which may be the same or similar to any of evaluations 425, 435 and 445 described above, or may be based upon different operator controls conditions. If conditional 450 is true the process proceeds to operator 499 which sets the operator controls condition variable equal to true. If conditional 445 is not true the process returns to operation 400 and may repeat.

Figure 5:
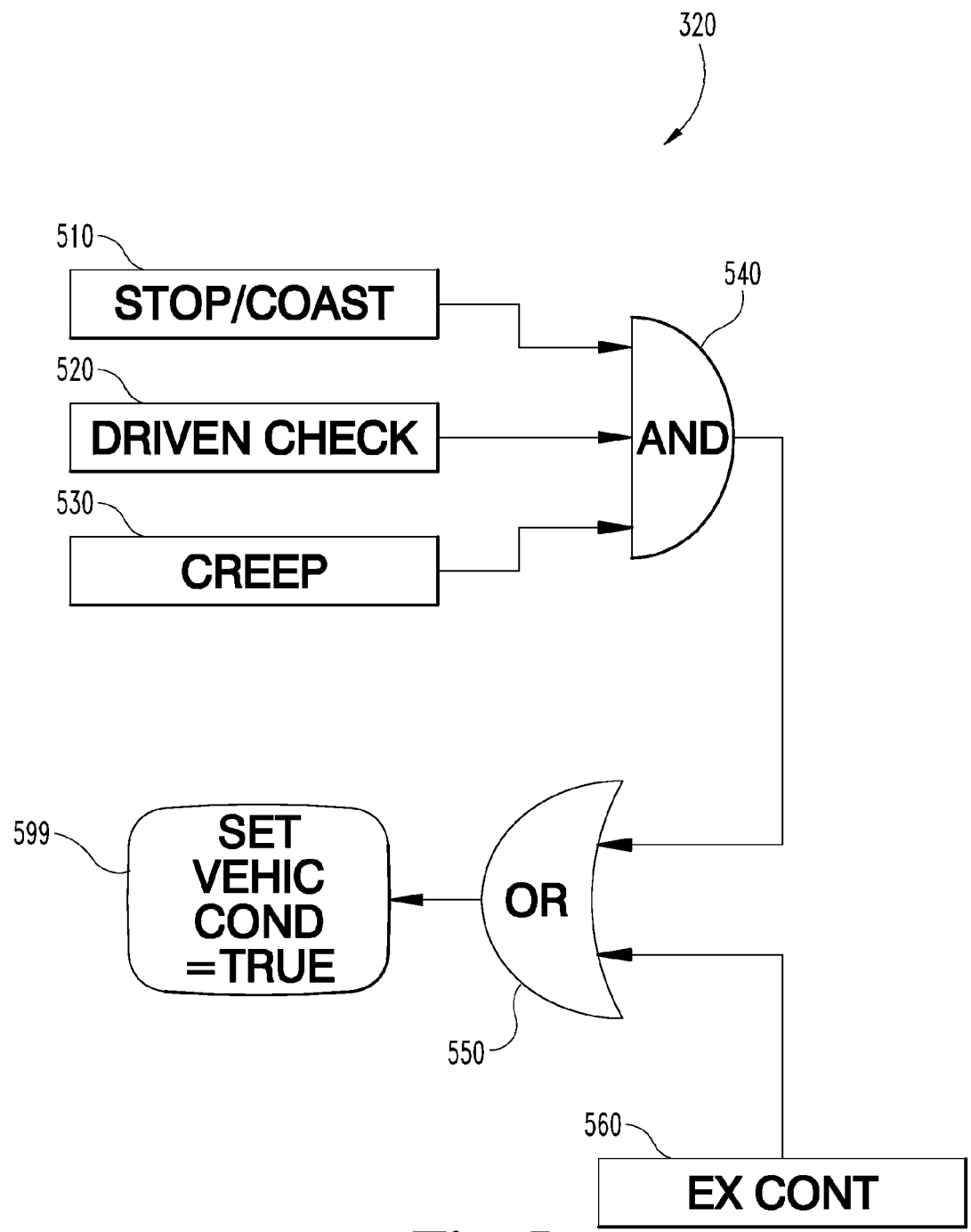

With reference to FIG. 5 there are illustrated further details of an exemplary implementation of vehicle condition 320. In the illustrated embodiment a stop/coast condition 510, a driven check condition 520, and a creep condition 530 are evaluated and provided as inputs to logical AND operator 540. Stop/coast conditional may evaluate whether vehicle speed is equal to zero or whether vehicle speed is near zero and dropping rapidly over a prescribed time period. The evaluation of near zero may be implemented by selecting one or more thresholds, and the functionality of evaluating whether speed is dropping rapidly may be implemented in a variety of manners, for example, by taking a derivative over time of vehicle speed.

Driven check condition 520 evaluates whether the vehicle has been driven since a first engine start event, it being understood that first engine start events may only refer to the first start of a day or other operating period, such as a cold start event, rather than the absolute first instance in which the vehicle engine was started. Creep condition 530 evaluates whether the vehicle is creeping in traffic, for example, inching along with very frequent stop and start occurrences. There are contemplated a variety of techniques for assessing creep condition.

The output of logical AND operator 540 is provided as an input to logical OR operator 550. External controller condition 560 is also provided to logical OR operator 550. External controller condition 560 evaluates whether one or more external controllers is requesting an engine stop event. The output of logical OR operator 550 is provided to operator 599 which sets the logical value of a vehicle.

Figure 6:
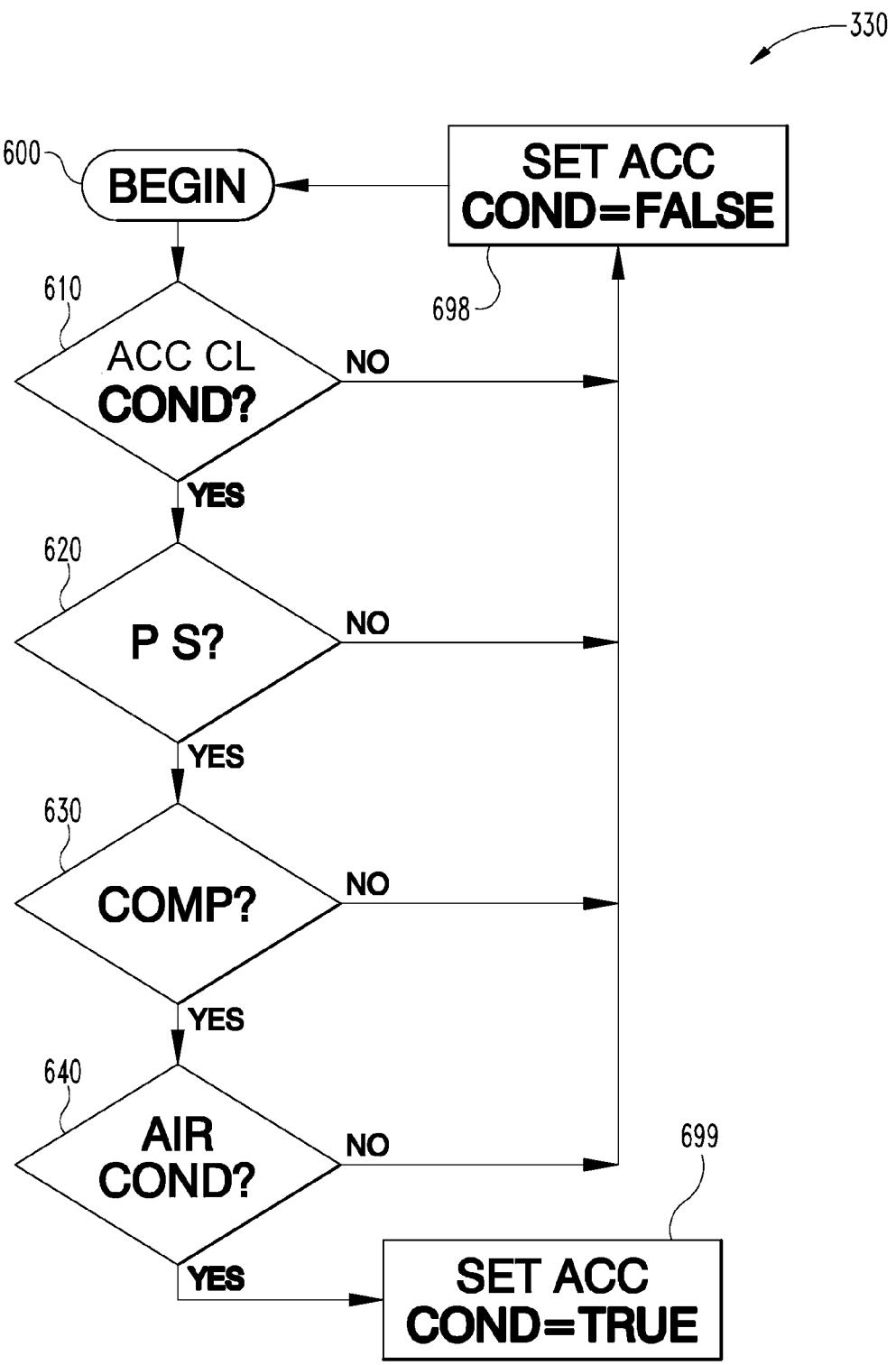

With reference to FIG. 6 there are illustrated further details of an exemplary controls process implementing accessories condition 330. The process begins at operation 600 and proceeds to conditional 610 which evaluates whether an accessories clutch state meets predetermined criteria, for example, whether the engine accessories main clutch is open or disengaged. If conditional 610 is not true, the process proceeds to operator 698 which sets the logical value of the accessories condition variable to false and then returns to operation 600 and may repeat. If conditional 610 is true, the process proceeds to conditional 620.

Conditional 620 evaluates whether a power steering condition has been satisfied, for example, whether the power steering demand is equal to zero or is below another predetermined threshold. If conditional 620 is not true, the process returns to operation 600 and may repeat. If conditional 620 is true, the process proceeds to conditional 630.

Conditional 630 evaluates whether an air compressor condition is satisfied, for example, whether the air compressor is disengaged or off, and the air tank pressure is greater than the minimum tank pressure. If conditional 630 is not true, the process returns to operation 600 and may repeat. If conditional 630 is true, the process proceeds to conditional 640 which evaluates whether an air conditioning condition is true, for example, whether an air conditioning system is disengaged or in an off state. If conditional 640 is not true, the process returns to operation 600 and may repeat. If conditional 640 is true, the process proceeds to operation 699 which sets the logical value of the accessories condition variable to true.

Figure 7:
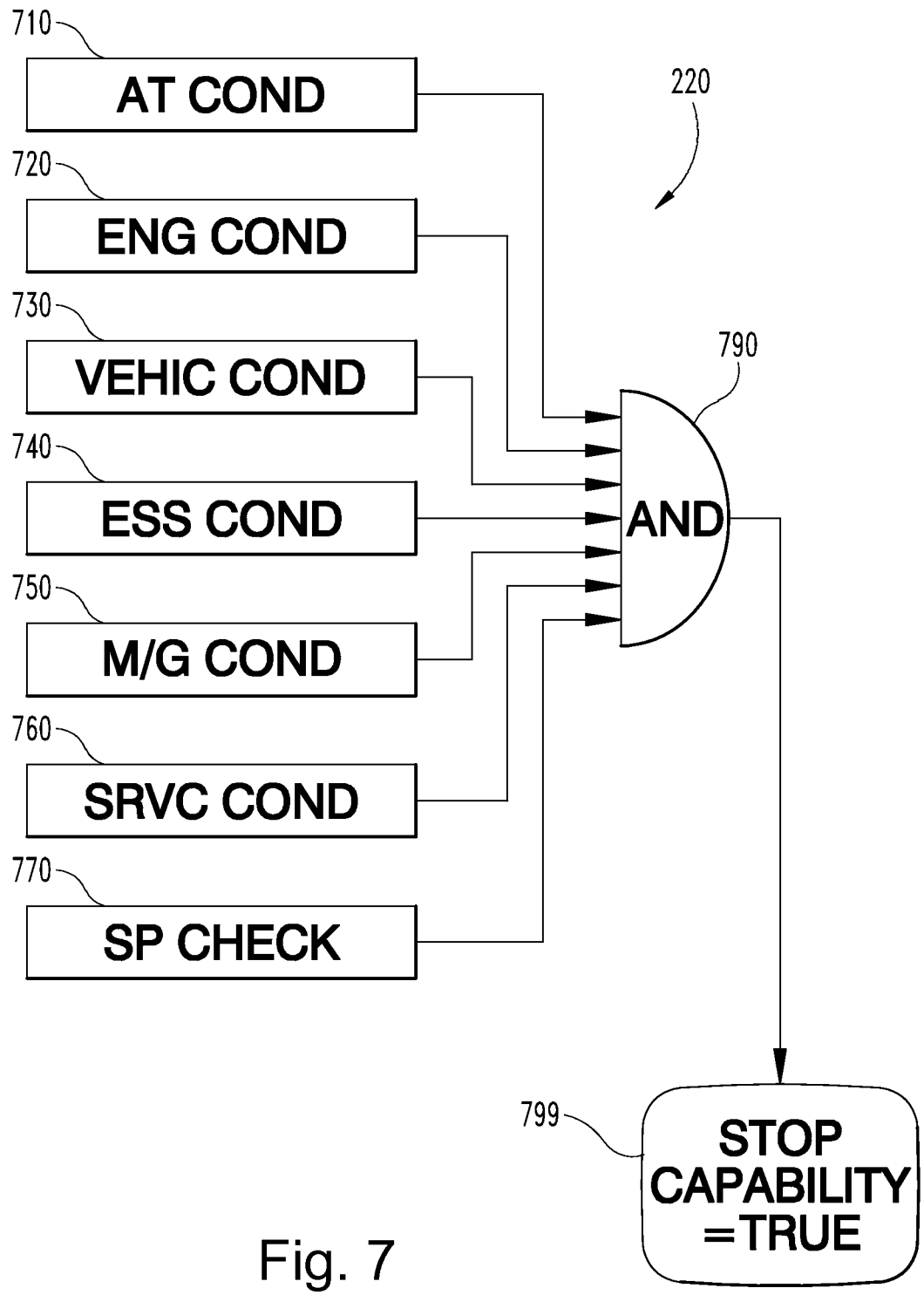

With reference to FIG. 7 there are illustrated further details of an exemplary implementation of stop capability condition block 220. In the illustrated embodiment stop capability condition block 220 evaluates an aftertreatment condition 710, an engine condition 720, a vehicle condition 730, and energy storage system condition 740, a motor generator system condition 750, a service condition 760, and a sensors/processes check 770. The logical values of the evaluation of each of these conditions is provided to logical AND operator 790 which in turn outputs to operation 799 that sets the logical value of a stop capability variable.

Aftertreatment condition 710 may generally evaluate whether an exhaust aftertreatment system condition is satisfied and no critical thermal events are currently active. In one form aftertreatment condition 710 may evaluate whether one or more aftertreatment temperatures, for example, DPF temperature, SCR temperature, and/or DOC temperature, are within a target range or below a target threshold. This may also include evaluating whether the system is not actively controlling to correct for temperature. Aftertreatment condition 710 may also evaluate whether a urea tank's on condition is inactive or off, whether urea quality/quantity based derates are present or active, whether the aftertreatment system is not in a regeneration state, such as DeNOx, Desorb, ($H_2O$, HC) Desoot, $O_2$Purge, or other regenerative emissions. Aftertreatment condition 710 may also evaluate whether a urea doser is currently not engaged in a critical activity and may be interrupted. Aftertreatment condition 710 may also evaluate whether any active aftertreatment errors are present.

Engine condition 720 may be implemented in a variety of manners. In one exemplary form engine condition 720 evaluates whether coolant temperature is within a certain temperature range (not cold and not overheated according to one or more predetermined criteria), and turbo temperature is within a certain temperature range or below a temperature threshold (not overheated), and the engine position sensor has no faults, and no engine protection state is currently active, and engine on time is greater than engine run time threshold, and time between consecutive engine stops if greater than the minimum stop time.

Vehicle condition 730 may be implemented in a variety of manners. In one form vehicle condition 730 evaluates whether power takeoff (PTO) is engaged and whether a vehicle operation null indicators, such as door closed, hood closed, fuel closed, seatbelt latched, are satisfied.

Energy storage system condition 740 may be implemented in a variety of manners. In one form energy storage system condition 740 evaluates whether there is adequate stored energy for running accessories during an engine off time, and whether there is adequate stored energy for a subsequent engine restart. These conditions may be implemented in a variety of manners, for example, using minimum threshold values, using prognostically calculated variables based upon historical data that may be averages or may be relied upon from a logic characteristic.

Motor generator system condition 750 may be implemented in a variety of manners. In one form motor generator system condition 750 evaluates whether a motor temperature is within a certain temperature range or below a predetermined temperature threshold, whether a motor fault mode is present, and whether a motor power capability is greater than or equal to a starting power demand. Service condition 760 evaluates whether the vehicle is currently engaged in a service or maintenance activity. Sensors/processes check 770 evaluates whether the sensors and controller processes required to make the foregoing determinations are found to be in proper working order.

Figure 8:
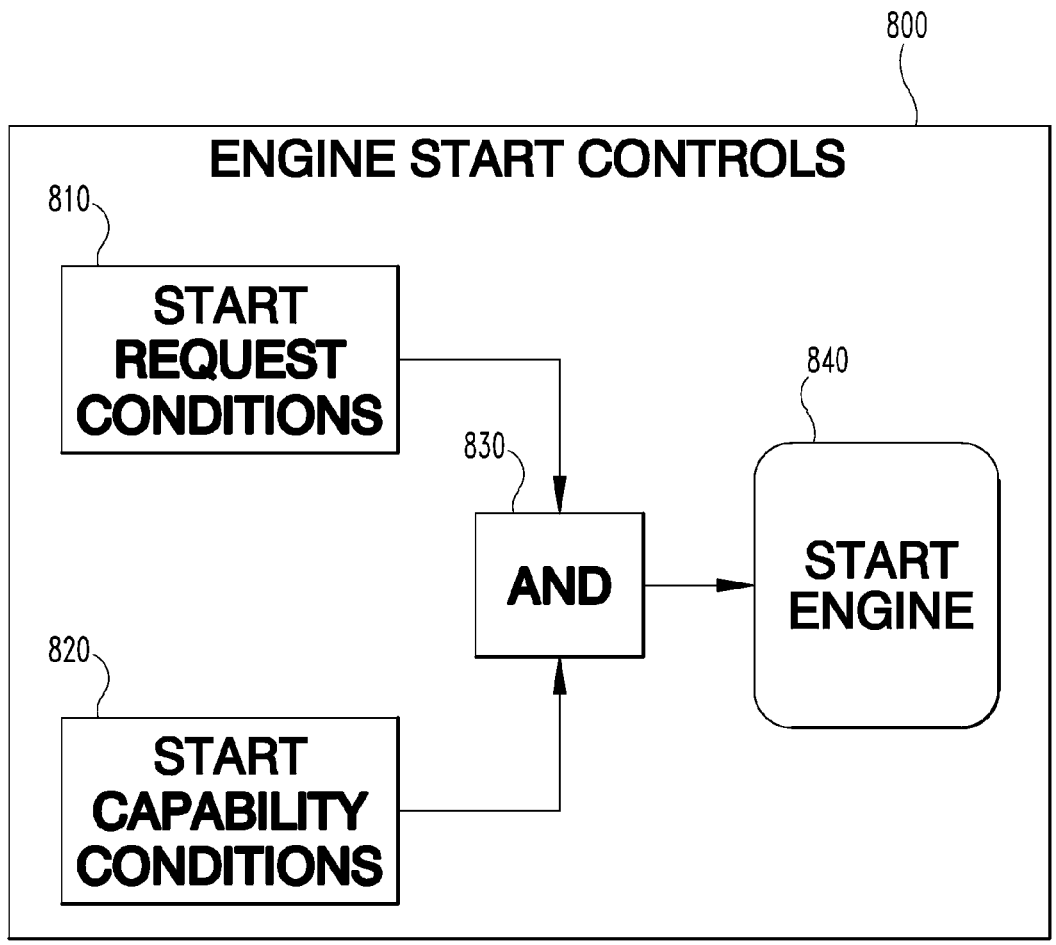
FIG. 8-11 illustrate exemplary engine start controls.

With reference to FIG. 8 there is illustrated an exemplary engine start control logic block 800 which may be implemented in connection with a controller such as controller 180 described above in connection with FIG. 1 or any of the alternative configurations discussed above. Start control logic block 800 includes a start request block 810 which evaluates whether one or more start request conditions are satisfied. A number of forms and implementations of block 810 are contemplated. In one example, block 810 evaluates an aftertreatment condition, an operator controls condition, an external controller condition, an energy storage system condition, an accessories condition, and a power takeoff condition. Further details of one example of such an embodiment are described below in connection with FIG. 9.

Start control logic block 800 includes a start capability conditional block 820 which evaluates whether one or more start capability conditions are satisfied. A number of forms and implementations of block 820 are contemplated. In one example, block 820 evaluates an engine condition, an aftertreatment system condition, a vehicle system condition, an energy storage system condition, motor/generator condition, a service condition, and a sensors/processes check. Further details of one example of such an embodiment are described below in connection with FIG. 11.

The output of start request conditional block 810 and the output of start capability conditional block 820 are provided to operator block 830 which implements a logical AND operation relative to the outputs of blocks 810 and 820. The output of operator block 830 is provided to engine start command block 840. When the output of operator block 830 is true, engine start command block 840 sets the logical state of an engine start request variable to true. When the output of operator block 830 is false, engine start command block 849 sets the logical state of an engine start request variable to false.

Figure 9:
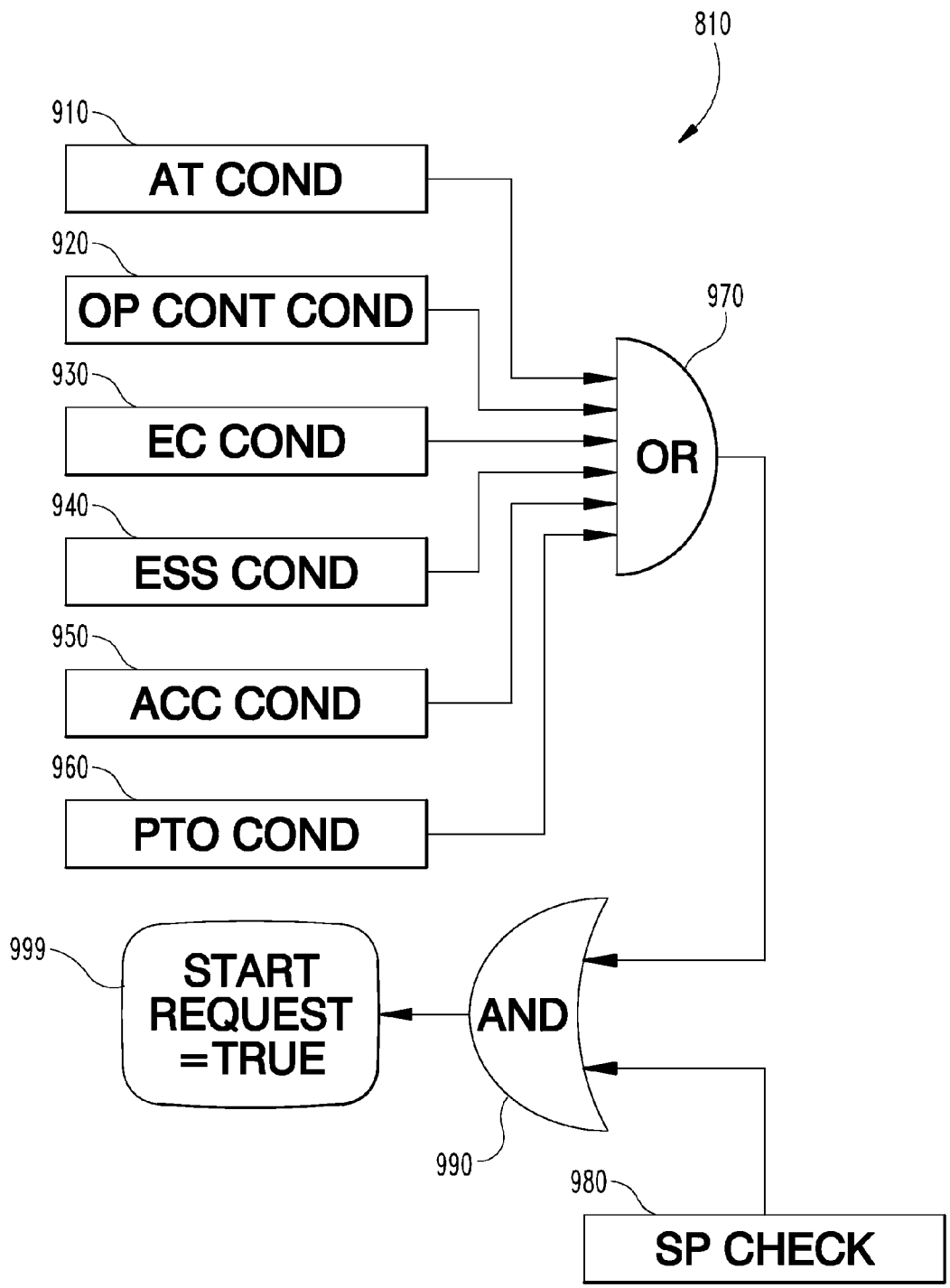

With reference to FIG. 9 there are illustrated further details of an exemplary implementation of start request block 810. In the illustrated embodiments start request block 810 evaluates an aftertreatment condition 910, an operator controls condition 920, an external controller condition 930, an energy storage system condition 940, an accessories condition 950, and a power takeoff condition 960. The logical outputs of the evaluations of these conditions are provided as inputs to logical OR operator 970 whose output is provided to logical AND operator 990. Sensors/processes check condition 980 is also provided as the logical value of sensors/processes check 980 is also provided as an input to logical AND operator 990. The output of logical AND operator 990 is provided to operation 999 which sets the logical value of the start request variable.

Aftertreatment condition 910 may be implemented in a variety of manners. In one form aftertreatment condition 910 evaluates whether engine exhaust aftertreatment temperature control is required. In one particular implementation aftertreatment condition 910 evaluates whether any critical aftertreatment temperatures, for example, DPF, SCR, DOC, are below a target or below a target range, or whether urea tank temperatures indicate a risk of freezing, or whether any active aftertreatment errors are true.

Operation controls condition 920 may be implemented in a variety of manners. One example of such an implementation is illustrated and described below in connection with FIG. 10. External controller condition 930 may be implemented in a variety of manners. In one form external controller condition 930 determines whether an LEM module is requesting an engine start. This may be utilized, for example, in situations in which an engine system or hybrid power train system is provided separately from the overall vehicle system and is configured to integrate with existing systems of the vehicle. Energy storage state condition 940 evaluates whether the recharging of the energy storage system is required. Accessories condition 950 evaluates whether critical belt driven engine accessories are transitioning to active. In one form accessories condition 950 evaluates whether a steering input (torque/position/rate) is greater than zero or greater than a predetermined threshold, or an air conditioning restart request is present, or an air tank pressure is below minimum pressure. Power takeoff condition 960 evaluates whether power takeoff from the engine is engaged.

Figure 10:
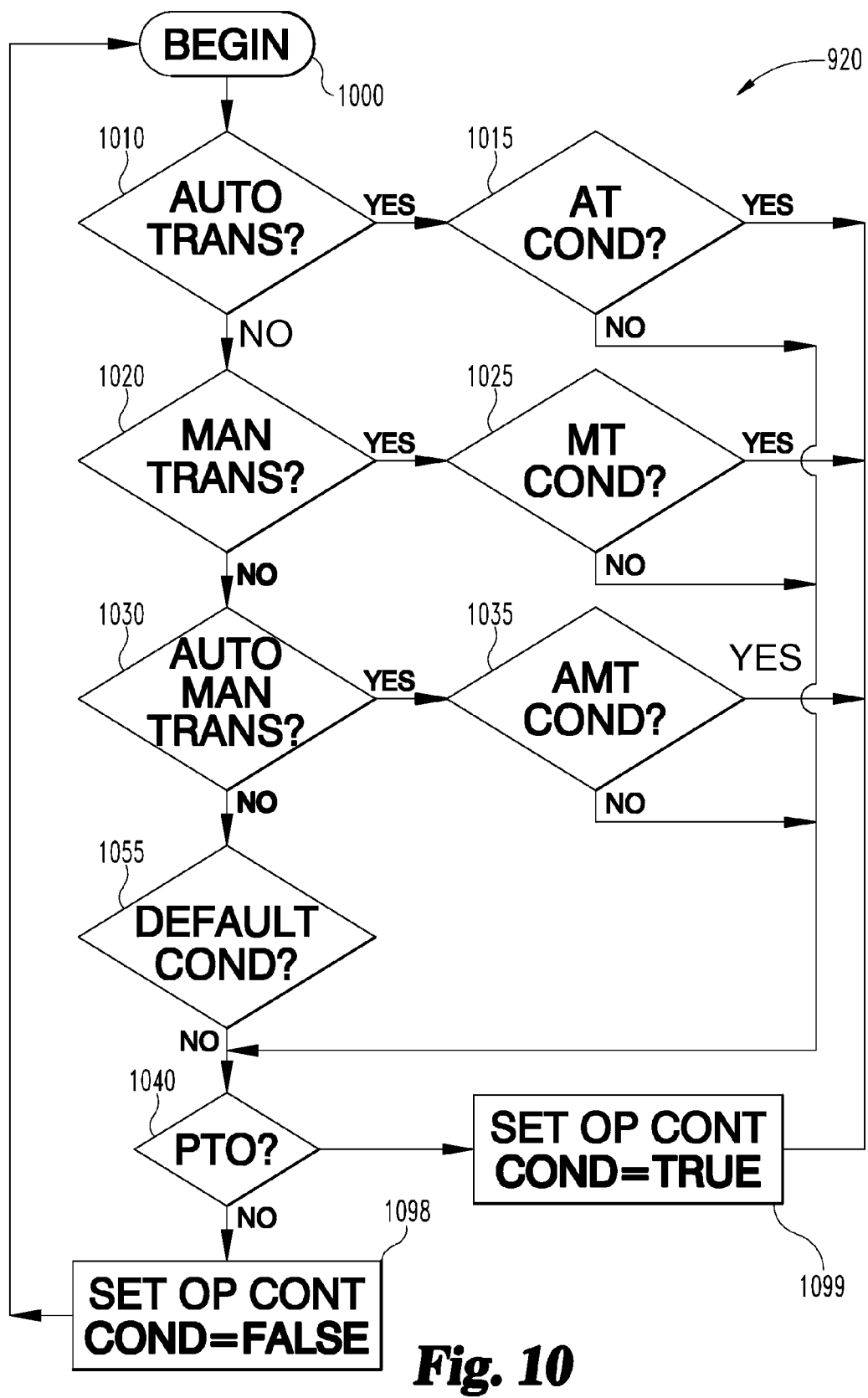

With reference to FIG. 10 there is illustrated an exemplary process implementing operator controls condition 920. The process begins at operation 1000 and proceeds to conditional 1010 which evaluates whether an automatic transmission is present in the system under control. This evaluation may be accomplished in the same or similar manner as described above in connection with the process of FIG. 4. If conditional 1010 is not true, the process proceeds to conditional 1020. If conditional 1010 is true, the process proceeds to conditional 1015 which evaluates whether an automatic transmission condition is satisfied. In one form conditional 1015 may evaluate whether the transmission is in a drive state, and the brake pedal and parking brake are released and disengaged, or whether the accelerator position has granted a minimal threshold. If conditional 1015 is true, the process proceeds to operation 1099 which sets an operator controls condition equal to true. If conditional 1015 is not true, the process proceeds to conditional 1040.

Conditional 1020 evaluates whether the manual transmission is present in the system under control. If conditional 1020 is not true, the process proceeds to conditional 1030. If conditional 1020 is true, the process proceeds to conditional 1025 which evaluates whether a manual transmission condition is true. In one form conditional 1025 evaluates (i) whether the parking brake is released and the brake pedal is disengaged, or (ii) one of the accelerator positions is greater than the minimum threshold. If conditional 1025 is true, the process proceeds to operation 1099. If conditional 1025 is not true, the process proceeds to conditional 1040.

Conditional 1030 evaluates whether an automated manual transmission is present in the system under control. This evaluation may be performed in any of the manners described above in connection with FIG. 4. If conditional 1030 is not true, the operation proceeds to conditional 1055. If conditional 1030 is true, the operation proceeds to conditional 1035 which evaluates whether an automated manual transmission condition is true. In one form conditional 1035 may evaluate whether the transmission is in the drive state, and the brake pedal is released and the parking brake is disengaged, or whether the accelerator position is greater than the minimum threshold. If conditional 1035 is true, the process proceeds to operation 1099. If conditional 1035 is not true, the process proceeds to conditional 1040.

Conditional 1055 evaluates whether a default condition is true. The default condition may be the same or similar as the conditions described above in connection with conditionals 1015, 1025, and 1035. If conditional 1055 is not true, the process proceeds to conditional 1040. If conditional 1055 is true, the process proceeds to operation 1099.

Conditional 1040 evaluates whether a power take off control is engaged. If conditional 1040 is false the process proceeds to operator 10498 which sets the value of operator controls condition equal to false and then returns to operation 1000 and may repeat. If conditional 1040 is true, the process proceeds to operation 1099 which sets the value of operator controls condition equal to true.

Figure 11:
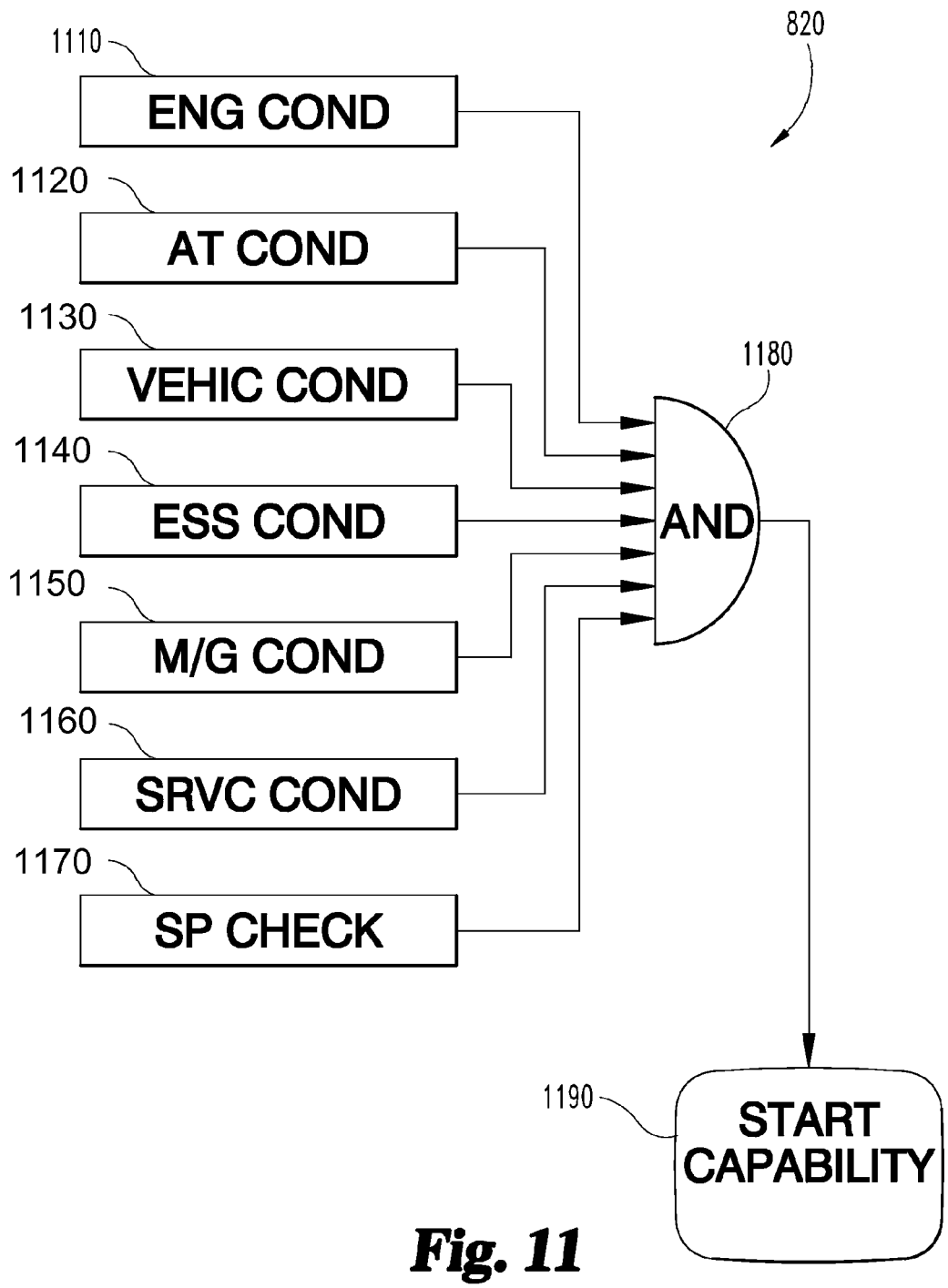

With reference to FIG. 11 there are illustrated further details of an exemplary implementation of start capability condition block 820. Start capability condition block 820 evaluates an engine condition 1110 and aftertreatment system condition 1120, a vehicle system condition 1130 and energy storage system condition 1140, a motor generator condition 1150, a service condition 1160, and a sensors/processes check 1170. The logical values resulting from evaluation of the foregoing conditions are provided to logical AND operator 1180. The output of the foregoing condition is provided to start operation 1190 which sets a start capability variable equal to the logical state of the output of logical AND operator 1180.

Engine system condition 1110 may evaluate whether vehicle security or anti-theft protection is currently off and whether the engine is currently stopped because of an automatic start/stop control. Aftertreatment conditions 1120 may evaluate whether one or more aftertreatment conditions are present which should inhibit the engine from starting. It is also contemplated that aftertreatment conditions 1120 may be omitted in certain embodiments.

Vehicle conditions 1130 may evaluate whether a vehicle operational indicator such as door closed, hood closed, fuel lid closed, seatbelt latched are satisfied, and a crash collision sensor indicates no collision and no fault mode, and an airbag sensor indicates that an airbag is not deployed. Motor generator system conditions 1150 may evaluate whether there is adequate motor capability to restart the engine. Energy storage system conditions 1140 may evaluate whether there is adequate stored energy capability to restart the engine. Service conditions 1160 may evaluate whether the vehicle is currently engaged in service maintenance activity. Sensors/processes check 1170 may evaluate whether the sensors and processes required to make the foregoing determinations are found to be in proper working order.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
providing a vehicle system including an engine, a plurality of engine accessories configured to be selectably driven by torque output of the engine, an aftertreatment system configured to receive exhaust from the engine during operation, a motor/generator system operatively coupled with the engine system, an energy storage system operatively coupled with the motor/generator system, an engine controller operatively coupled with the engine, the aftertreatment system, the motor/generator system and the energy storage system, and a plurality of operator controls in operative communication with the engine controller;
while the engine is running, operating the engine controller to conditionally stop the engine based upon a plurality of stop request criteria processed by a stop request block implemented in the engine controller and a plurality of stop capability criteria processed by a stop capability block implemented in the engine controller, the processing of the stop request criteria establishing when the engine controller will request an engine stop and the processing of the stop capability criteria establishing a constraint on the engine controller to conditionally prevent engine stop; and
after the engine has stopped, operating the engine controller to conditionally start the engine based upon a plurality of start request criteria and a plurality of start capability criteria;
wherein the stop request block is structured to receive as input and to evaluate a first plurality of values indicating a condition of the operator controls, a velocity condition of the vehicle system, an operating condition of the vehicle accessories, an operating condition of the engine, and a request provided by a second controller external to the engine controller; and
wherein the stop capability block is structured to receive as input and to evaluate a second plurality of values and the engine controller will conditionally prevent engine stop as long as the evaluation of at least one of said second plurality of values indicates a condition preventing engine stop.

2. The method of claim 1 wherein the stop capability criteria include a plurality of temperature criteria including a first criterion for temperature of the engine, a second criterion for temperature of a turbocharger operatively coupled with the engine, and a third criterion for temperature of the aftertreatment system.

3. The method of claim 2 wherein the stop capability criteria account for a predicted capability of the energy storage system.

4. The method of claim 3 wherein the predicted capability of the energy storage system accounts for whether sufficient energy is stored to drive one or more of the engine accessories when the engine is off and whether sufficient energy is stored to restart the engine.

5. The method of claim 2 wherein the stop capability criteria account for a predicted capability of the motor/generator system.

6. The method of claim 5 wherein the predicted capability of the motor/generator system is based upon a temperature associated with the motor/generator system.

7. The method of claim 1 wherein the start request criteria comprise a temperature condition of the aftertreatment system, a condition of the operator controls, a charge condition of the energy storage system, and a condition of the engine accessories, wherein each of said start request criteria is capable of requesting the engine to start independent of the other start request criteria.

8. The method of claim 1 wherein the start capability criteria account for a first capability of the energy storage system to start the engine and a second capability of the motor/generator system to start the engine.

9. A vehicle system comprising:
an engine operatively coupled with a drivetrain;

an aftertreatment system configured to treat exhaust output by the engine;

a motor/generator operatively coupled with the drivetrain;

an energy storage system operatively coupled with the motor/generator; and an engine controller in operative communication with the engine, the aftertreatment system, the motor/generator, and the energy storage system;

wherein the engine controller is configured to conditionally command the engine to stop based upon a stop request conditional which determines whether to request the engine to stop and a stop capability conditional which conditionally constrains the stop request conditional to prevent engine stop;

wherein the stop request conditional is satisfied if either (a) the engine controller receives a stop request from a second controller, or (b) the engine controller determines that a plurality of conditions are satisfied, the plurality of conditions including an accelerator condition, a brake condition, a vehicle speed condition, and an engine accessories condition, and is conditionally constrained by the stop capability conditionally in both instance (a) and instance (b); and wherein the stop capability conditional will prevent engine stop as long as one or more of a plurality of inputs received by the stop capability conditional evaluates as true.

10. The vehicle system of claim 9 wherein the stop capability conditional is satisfied if the engine controller determines that a plurality of system protection conditions are satisfied, the plurality of system protection conditions comprising at least one temperature condition of one or more of the system, an energy storage system charge condition, and a motor/generator system condition.

11. The vehicle system of claim 10 wherein the at least one temperature condition of the system accounts for a temperature condition of the engine coolant, a temperature condition of a turbocharger operatively coupled with the engine, and a temperature condition associated with the aftertreatment system.

12. The vehicle system of claim 10 wherein the energy storage system charge condition accounts for whether sufficient energy is stored to drive one or more loads when the engine is off and whether sufficient energy is stored to restart the engine.

13. The vehicle system of claim 10 wherein the motor/generator system condition accounts for a temperature associated with the motor/generator system.

14. The vehicle system of claim 9 wherein the engine controller is configured to conditionally command the engine to restart based upon a restart request conditional and a restart capability conditional;

wherein the restart request conditional comprises a temperature condition of the aftertreatment system, a condition of the operator controls, a charge condition of the energy storage system, and a condition of the engine accessories, wherein each of said start request criteria is capable of requesting the engine to start independent of the other start request criteria;

wherein the restart capability conditional accounts for a first capability of the energy storage system to start the engine and a second capability of the motor/generator system to start the engine.

15. A control module comprising:

at least one processor;

a communication network interface in operative communication with the processor; and at least one non-transitory computer readable medium configured to store instructions executable by the processor to evaluate a stop request conditional which determines whether to request the engine to stop, a stop capability conditional which conditionally constrains the stop request conditional to prevent engine stop, a start request conditional which determines whether to request the engine to stop and a start capability conditional which conditionally constrains the start request conditional to prevent engine start;

wherein the stop request conditional evaluates an operator controls variable, a vehicle condition variable, an engine condition variable, and an external stop request received by the communication network interface, and wherein receipt of the external stop request by the communication network interface satisfies the stop request conditional independent of the operator controls variable, the vehicle condition variable, and the engine condition variable while remaining subject to the constraint of the stop capability conditional; and wherein the stop capability conditional will prevent engine stop as long as any of a plurality of inputs received by the stop capability conditional is true.

16. The control module of claim 15 wherein the stop capability conditional evaluates a plurality of system temperature variables.

17. The control module of claim 16 wherein the stop capability conditional evaluates an energy storage system condition variable.

18. The control module of claim 17 wherein the stop capability conditional evaluates a motor/generator system variable.

19. The control module of claim 15 wherein the start request conditional evaluates true based upon any of an engine sensor error variable, an aftertreatment system temperature variable, an operator controls condition variable, an energy storage system variable, and an engine accessories variable being true.

20. The control module of claim 15 wherein the start capability request conditional evaluates true based upon at least an energy storage system capability variable and a motor/generator system capability variable being true.

* * * * *